US00RE35545E

United States Patent [19]

Chrysler

[11] E Patent Number: Re. 35,545

[45] Reissued Date of Patent: Jul. 1, 1997

[54] CERAMIC VALVE

[75] Inventor: Jimmie D. Chrysler, Wyoming, Mich.

[73] Assignee: Amerikam, Inc., Grand Rapids, Mich.

[21] Appl. No.: 257,940

[22] Filed: Jun. 10, 1994

Related U.S. Patent Documents

Reissue of:

[64] Patent No.: 5,174,324
Issued: Dec. 29, 1992
Appl. No.: 643,796
Filed: Jan. 22, 1991

U.S. Applications:

[63] Continuation of Ser. No. 90,884, Jul. 12, 1993, abandoned.

[51] Int. Cl.[6] ..... F16K 27/06

[52] U.S. Cl. ..... 137/315; 137/454.2

[58] Field of Search ..... 137/315, 454.2, 137/454.5, 454.6, 625.31

[56] References Cited

U.S. PATENT DOCUMENTS

| | | | |
|---|---|---|---|
| 209,382 | 10/1878 | Corkhill . | |
| 592,187 | 10/1897 | Berr . | |
| 2,935,293 | 5/1960 | Monson . | |
| 2,994,343 | 8/1961 | Banks . | |
| 3,144,878 | 8/1964 | Williams . | |
| 3,207,181 | 9/1965 | Willis . | |
| 3,331,396 | 7/1967 | Willis . | |
| 3,372,709 | 3/1968 | Dolter . | |
| 3,645,493 | 2/1972 | Manoogian et al. . | |
| 3,780,758 | 12/1973 | DeVries | 137/454.6 |
| 3,807,455 | 4/1974 | Farrell | 137/625.31 |
| 3,810,602 | 5/1974 | Parkinson . | |
| 3,831,621 | 8/1974 | Anthony et al. | 137/454.6 X |
| 3,834,416 | 9/1974 | Parkison . | |
| 4,005,728 | 2/1977 | Thorp . | |
| 4,175,586 | 11/1979 | Hayman . | |
| 4,250,912 | 2/1981 | Knapp . | |
| 4,286,620 | 9/1981 | Turney | 137/454.2 |
| 4,331,176 | 5/1982 | Parkison | 137/454.5 |
| 4,360,040 | 11/1982 | Cove et al. . | |
| 4,395,019 | 7/1983 | Searles . | |
| 4,397,330 | 8/1983 | Hayman . | |
| 4,431,028 | 2/1984 | Hendrick . | |
| 4,453,567 | 6/1984 | MacDonald . | |
| 4,530,467 | 7/1985 | Bueno . | |
| 4,532,958 | 8/1985 | Napolitano | 137/454.6 X |
| 4,641,685 | 2/1987 | Rudelick . | |
| 4,651,770 | 3/1987 | Denham et al. . | |
| 4,723,567 | 2/1988 | Philipot et al. . | |
| 4,738,277 | 4/1988 | Thomas . | |
| 4,821,765 | 4/1989 | Iqbal et al. . | |
| 4,844,116 | 7/1989 | Buehler et al. . | |
| 4,881,570 | 11/1989 | Ziebach et al. . | |
| 4,899,982 | 2/1990 | Lange . | |
| 4,924,903 | 5/1990 | Orlandi | 137/454.5 |
| 4,944,330 | 7/1990 | Sakakibara et al. . | |

*Primary Examiner*—Stephen M. Hepperle
*Attorney, Agent, or Firm*—Varnum, Riddering, Schmidt & Howlett LLP

[57] ABSTRACT

A valve cartridge is disclosed which includes ceramic discs and a retainer force-fit and positively located on the end of a valve cartridge body. The retainer frictionally secures valve elements within the valve body.

17 Claims, 4 Drawing Sheets

CERAMIC VALVE

Matter enclosed in heavy brackets [ ] appears in the original patent but forms no part of this reissue specification; matter printed in italics indicates the additions made by reissue.

*This is a continuation of application Ser. No. 08/090,884, filed Jul. 12, 1993, now abandoned, which is a reissue application of application Ser. No. 08/643,796, issued as U.S. Pat. No. 5,174,324.*

BACKGROUND OF THE INVENTION

The present invention relates to a ceramic disc valve cartridge for faucets, spigots, taps, or the like, and more particularly to such a valve cartridge including a force-fit retainer which holds the ceramic discs in said valve.

Valve cartridges are known which use a rotating ceramic disc and a fixed ceramic disc adjacent one another to control the flow of fluids through the cartridge. The rotating and fixed ceramic discs have apertures therethrough such that the rotating disc moves between a fully closed position wherein the rotating disc completely blocks the apertures in the fixed disc and a fully open position wherein apertures in both discs are fully aligned. Additionally, the rotating disc may assume any position between the fully blocking and fully aligned positions which allows the user to adjust fluid flow through the cartridge. The contacting surfaces of the fixed and ceramic discs are manufactured to a tolerance that prevents water passing therebetween. An advantage of the ceramic discs is that they do not require a large number of turns in order to move between the completely open and the completely closed positions. Additionally, such ceramic disc valves do not drip and last substantially longer than conventional gasket valves.

Valve cartridges are also known which include two ceramic discs secured within the valve body by a retainer. One such retainer is illustrated in U.S. Pat. No. 3,807,455 to Farrell which shows a valve body and retainer which are made from plastic. The valve body and retainer are held together by ultrasonic welding. However, plastic parts do not have sufficiently stable properties for long term durability. Additionally, ultrasonic welding increases the steps required to assemble the valve and may alter the body or retainer shape during welding.

Other prior art retainers are illustrated in U.S. Pat. No. 3,881,570 to Ziebach et al. and U.S. Pat. No. 3,831,621 to Anthony et al. Both of these retainers are received on the end of the valve body and held in a channel circumscribing the inside of the valve body. However, providing a circumscribing channel on the inside of the valve body makes manufacturing of the valve body difficult. Further, the retainers of Ziebach et al. and Anthony et al. only support two sides of a sealing gasket adjacent the inlet end of the valve cartridge and thus do not provide sufficient support for an O-ring.

U.S. Pat. No. 4,331,176 to Parkinson shows a valve cartridge including ceramic discs and a tail piece which is received within the valve assembly body. However, the tail piece includes a projection received within the fixed ceramic disc, and the tail piece exerts a force on the ceramic discs which varies. Thus, the tail piece may exert too much force on the ceramic disc which substantially reduces the life of the valve discs or increase the force required to rotate the ceramic discs. On the other hand, the tail piece may not exert sufficient force on an O-ring positioned between the tail piece and the fixed ceramic disc for the O-ring to provide a fluid seal.

U.S. Pat. No. 4,821,765 to Iqbal et al. and U.S. Pat. No. 4,651,770 to Denham et al. show valve cartridges including ceramic discs and having gaskets which secure the discs in the cartridge body. The gaskets also provide a sealing surface adjacent the inlet of the valve cartridge. However, a force exerted on the gaskets is transferred to the ceramic discs which makes it difficult to predict and control the force exerted on the discs when the cartridge is inserted into a faucet casting. Additionally, the gaskets may expand under certain conditions which would increase the force exerted on the ceramic discs. Further, the gaskets may harden and crack which may lead leaking and loss of the gasket's resilience. When the gasket looses resilience it will not adequately secure the ceramic discs within the valve body.

SUMMARY OF THE INVENTION

The present invention avoids the problems of prior valve cartridges by including a retainer having a complementary shape to a cartridge valve body and force-fit on an end of the valve cartridge body to secure the ceramic discs therein. The retainer includes a portion which contacts the end of the valve body to positively locate the retainer relative to the valve body. Because a force-fit is relied on to secure the retainer, there is no need to weld the retainer in place, which would vary the dimension between the retainer and the disc stack, thereby eliminating positive location of the retainer relative to the valve body.

By providing such a positively located retainer, the pressure exerted on the contacting surfaces of the ceramic discs is controlled and the life of the ceramic discs carried within the valve body is increased. Additionally, the valve body may be easily manufactured. Furthermore, the coupling of the valve cartridge to the casting with which the valve assembly is used is facilitated by the ring seal retainer, as the retainer may be shaped to interface with any casting. Thus, a standard valve body may be used in different faucets by providing different retainers each of which is adapted to interconnect the standard body with a respective faucet casting. These and other objects, advantages and features will become apparent upon review of the following specification in conjunction with the drawings.

BRIEF DESCRIPTION OF THE DRAWINGS

FIG. 3d is a side sectional view of the valve assembly body taken along the plane III—III in FIG. 3a;

FIG. 4b is a side sectional view of the actuator stem taken along the line IV—IV in FIG. 4a;

FIG. 6c is a side sectional view of the rotating ceramic disc taken along the plane VI—VI in FIG. 6a;

FIG. 8b is a side sectional view taken along the line VIII—VIII in FIG. 8a; and

DESCRIPTION OF THE PREFERRED EMBODIMENT

Figure 1:
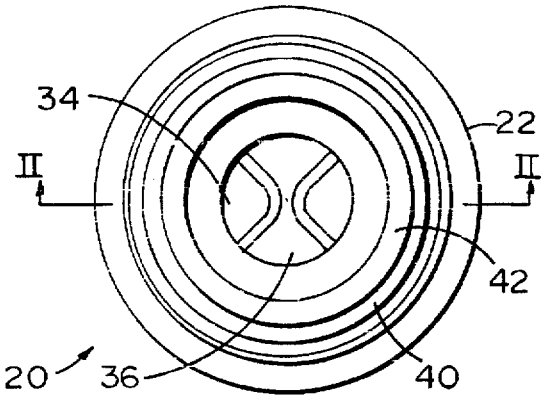
FIG. 1 is a bottom elevational view of a valve assembly according to the invention.
Figure 2:
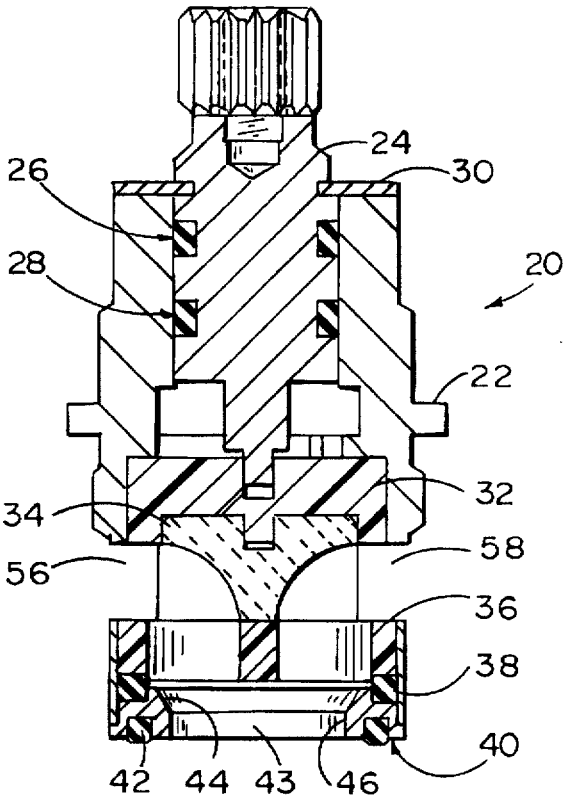
FIG. 2 is a side sectional view of the valve assembly according to the invention taken along the plane II—II of FIG. 1.
Figure 3A:
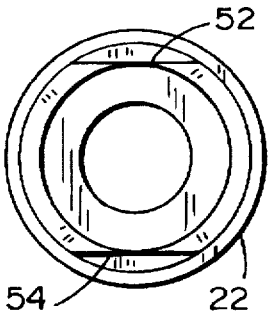
FIG. 3a is a top elevational view of the valve assembly body according to the invention.
Figure 3B:
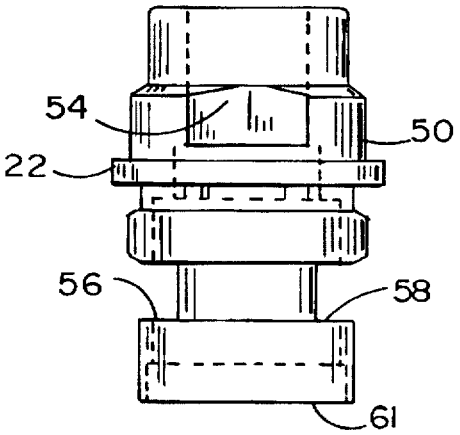
FIG. 3b is a side elevational view of the valve assembly body according to the invention.
Figure 3C:
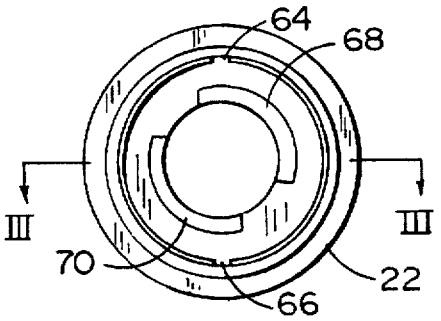
FIG. 3c is a bottom elevational view of the valve assembly body according the the invention.
Figure 3D:
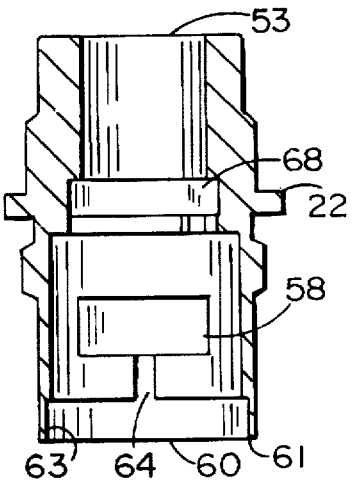

A valve cartridge 20 according to an embodiment of the invention is illustrated in FIGS. 1 and 2 and includes a valve assembly body 22 which receives actuating stem 24 carrying a first O-ring 26 and a second O-ring 28, said actuating shaft being held in valve assembly body 22 by a retaining ring 30. Additionally, valve cartridge 20 includes a disc stack comprising a plastic disc 32 which is keyed to the actuating stem 24, a rotating ceramic disc 34 which is also keyed to plastic disc 32, and a fixed ceramic disc 36 positioned adjacent rotating ceramic disc 34. An O-ring 38 is positioned between force-fit retainer 40 and fixed disc 36. Retainer 40 holds O-ring 38 as well as discs 32, 34 and 36 in body 22 and carries an O-ring 42. Retainer 40 is shown with an aperture 43 comprising varying diameter portion 44 and a constant diameter portion 46, although the diameter of the internal opening 43 may be uniform throughout retainer 40.

Figure 4A:
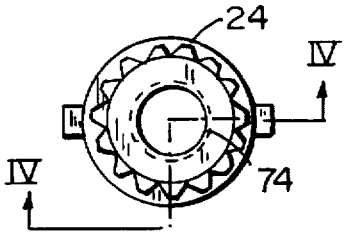
FIG. 4a is a top elevational view of the actuator shaft according to the invention.
Figure 4C:
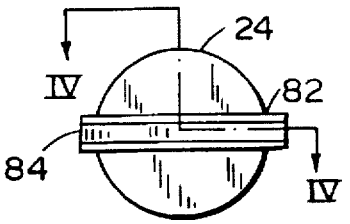
FIG. 4c is a bottom elevational view of the actuator stem.

Valve assembly body 22 (FIGS. 3a–3d) is preferably brass, and includes an upper portion 50 having flat sides 52 and 54 which provide surfaces by which a tool grips the cartridge body for rotating it or holding it against rotation. Upper portion 50 may also be advantageously provided with more than two flat surfaces. Body 22 further includes fluid outlet apertures 56 and 58 through which fluid exits the cartridge. Additionally, a circumscribing counterbore 62 is positioned adjacent opening 60 for receiving O-ring 38 and retainer 40. A pair of slots 64 and 66 receive tabs of fixed disc 36, as described below. Additionally, slots 68 and 70 receive the blade of actuator shaft 24 (FIG. 4c) to limit the rotation of actuating shaft 24, plastic disc 32, and rotating disc 34.

Figure 4B:
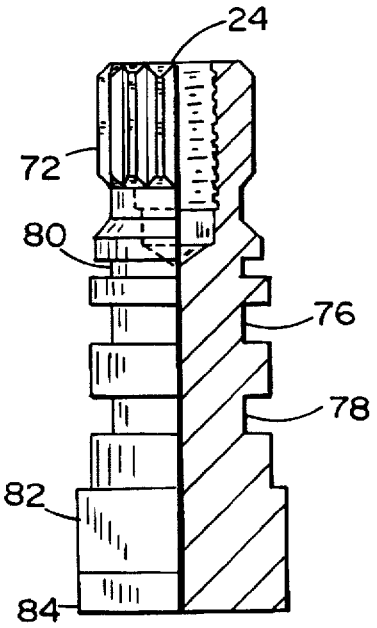
Figure 5A:
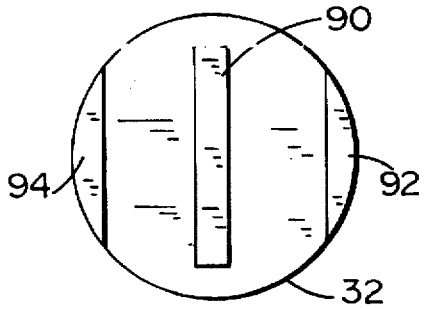
FIG. 5a is a bottom elevational view of the plastic disc according to the invention.
Figure 5B:
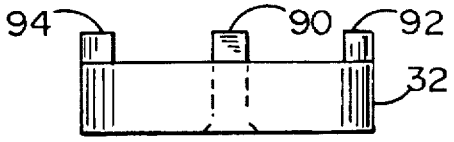
FIG. 5b is a side elevational view of the plastic disc according to the invention.
Figure 5C:
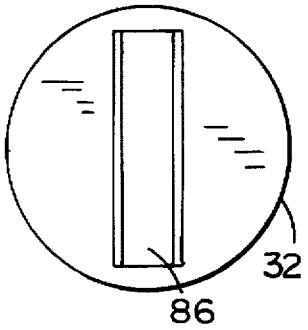
FIG. 5c is a top elevational view of the plastic disc according to the invention.
Figure 6C:
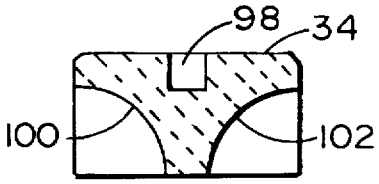
Figure 6B:
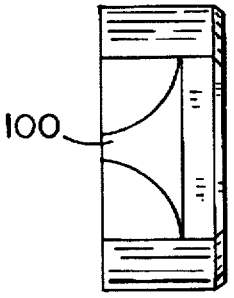
FIG. 6b is a side elevational view of the rotating ceramic disc according to the invention.
Figure 6A:
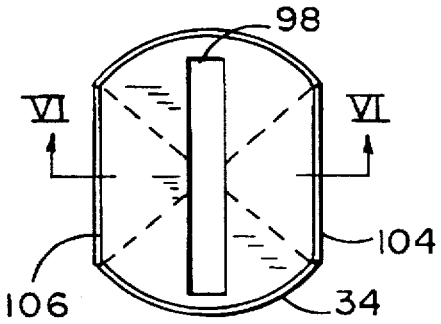
FIG. 6a is a top elevational view of the rotating ceramic disc according to the invention.
Figure 7A:
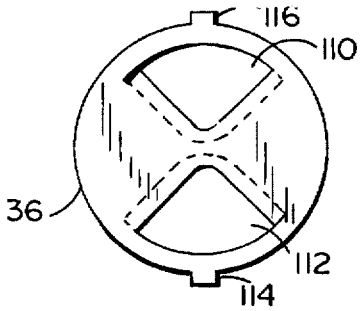
FIG. 7a is a top elevational view of the fixed ceramic disc according to the invention.
Figure 7B:
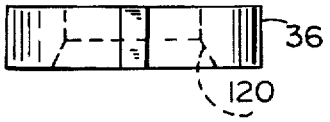
FIG. 7b is a side elevational view of the fixed ceramic disc according to the invention.
Figure 7C:
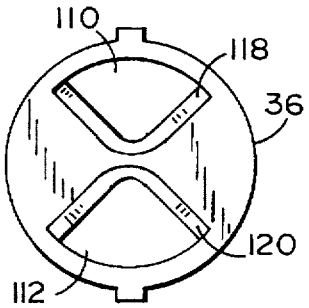
FIG. 7c is a bottom elevational view of the fixed ceramic disc according to the invention.

Actuating shaft 24 (FIGS. 4a–4c) includes a serrated head 72 which receives a handle (not shown), the handle including a screw (not shown) which is received within a threaded central aperture 74. A channel 80 receives retainer 30 to hold shaft 24 in the valve body. Channels 76 and 78 circumscribe shaft 24 and receive O-rings 26 and 28. Actuating shaft 24 further includes a substantially rectangular projection 82 having a blade 84 thereon. Projection 82 rotates within slots 68 and 70 (FIG. 3c) and blade 84 is received in a slot in plastic disc 32 (FIG. 5c) as described below.

A disc stack includes plastic disc 32 (FIG. 2), rotating disc 34 and fixed disc 36. Plastic disc 32 (FIGS. 4i a–4c) includes a slot 86 which receives blade 84 of actuating shaft 24. Plastic disc 32 further includes three projections 90, 92 and 94. Slot 98 is parallel to projections 90, 92 and 94, and thus is illustrated for left-hand control, whereas right-hand control would be implemented by slot 86 being orthogonal to projections 90, 92 and 94. Rotating ceramic disc 34 includes a central slot 98 and flat sides 104 and 106 parallel thereto. The rotating ceramic disc also includes a first passage 100 and a second passage 102 which provide passages for fluid. Fixed ceramic disc 36 includes passages 110 and 112, through which fluid flows when passages 100 and 102 are aligned therewith. The fixed disc further includes projections 114 and 116 which are received within slots 64 and 66 of valve body 60 (FIG. 2b) which hold the fixed disc against rotation. Apertures 110 and 112 include increasing area portions 118 and 120, respectively, which channel fluids from the aperture in the force-fit retainer 40 to passages 100 and 102 of rotating ceramic disc 34.

Figure 8A:
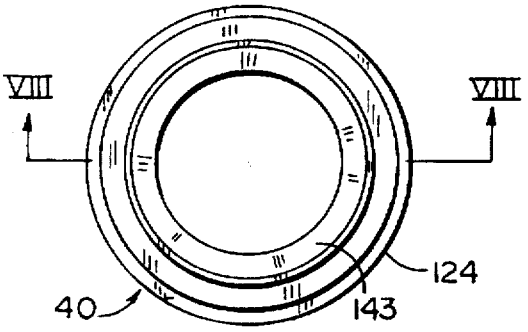
FIG. 8a is a top elevational view of the force fit retainer according to the invention.
Figure 8B:
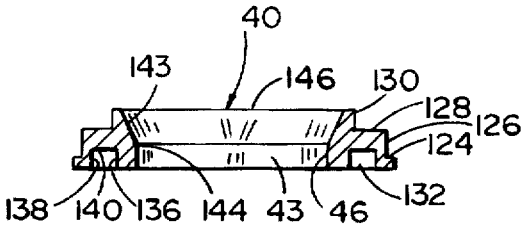

A brass force-fit retainer 40 (FIGS. 8a and 8b) is complementary to the end 60 (FIG. 3d) of valve body 22. Thus, retainer 40 is force-fit on the valve body and the friction therebetween secures discs 32, 34 and 36 as well as O-ring 38 within body 22. Retainer 40 includes a first annular surface 124 which circumscribes retainer 40 for positioning adjacent end 61 of body 22. A second circumscribing surface 126 projects orthogonally to surface 124 for positioning adjacent circumscribing surface 63 in body 22. By positioning surface 124 against end 61, and by using a force-fit rather than a welded construction, retainer 40 is positively located relative to valve body 22. The distance between retainer 40 and fixed disc 36 is thus positively established and the pressure on disc 36 and disc 34 is consistent from valve to valve. By "positively located" it is meant that the position of retainer 40 relative to valve body 22 is constant and repeatable from valve to valve. That would not be true if annular portion 124 did not engage end 61 of valve body 22, or if retainer 40 were welded in place, which operation could change the effective length of valve body 22.

Annular surfaces 128 and 130 project orthogonally to one another and provide two of the four surfaces which contact O-ring 38 (FIG. 2) when it is sealed within valve body 22. An annular channel 132 has three orthogonal sides 136, 138 and 140, sides 136 and 138 being parallel to one another and substantially orthogonal to side surface 140. The three sides 136, 138 and 140 provide three of four sides for an O-ring 42 (FIG. 2) which provides a seal between the end of valve cartridge 20 and the casting of a faucet (not shown) which receives the cartridge. An increasing diameter portion 143 of retainer 40 channels fluid between smaller opening 144 and larger opening 146 of the retainer. The larger diameter opening 146 is adjacent fixed disc 36. Thus, diameter 146 is large enough that the retainer does not interfere with passage of water through passages 110 and 112 in disc 36. However, increasing diameter portion 143 would not be necessary where the opening 144 is large enough that it would not interfere with apertures 110 and 112. Although side 150 is illustrated generally flat, side 150 may be shaped to connect with any faucet casting. Thus, the cartridge may be used in any faucet by providing a retainer which complements the casting in which it is used.

Figure 9:
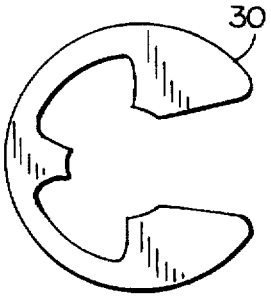
FIG. 9 illustrates a retainer clip of the invention.

A retainer clip 30 is illustrated in FIG. 9. The shape of the retainer clip is only illustrative, as the clip need only secure actuator shaft 24 in valve assembly body 22. Accordingly, the clip need only be configured to resiliently engage the channel 80 and provide a large enough surface to prevent the clip from moving into opening 53 in body 22.

To assemble cartridge 20, actuator shaft 24 carrying O-rings 26 and 28 is inserted through opening 60 in valve body 22 until the channel 80 projects past the opening 53. O-rings 26 and 28 provide a seal which prevents fluid from flowing between actuating shaft 24 and body 22. The O-rings may either be self-lubricating or may have a lubricant applied to the surface thereof. Channel 80 will be properly positioned to receive the clip 30 when projection 82 is positioned within slots 68 and 70 of the valve body. Clip 30 is then inserted into channel 80 which secures the position of shaft 24. Plastic disc 32 is then inserted into the valve body and blade 84 received within slot 86. Rotating ceramic disc 3 is then inserted such that projection 90 is received within slot 98, and projections 92 and 94 are positioned between flat sides 104 and 106 of ceramic disc 34 and body 22. The fixed ceramic disc is inserted by sliding projections 114 and 116 into grooves 64 and 66. The retainer with O-ring 38 carried thereon is then force-fit onto end 61 of valve body 22. Surface 124 is thus positioned against surface 61 on body 22, and surface 126 is positioned against surface 63 to frictionally secure retainer 40 on body 20. Thus, cartridge 20 provides a one-piece unit which may be inserted into a faucet.

In operation, rotation of actuator shaft 24 causes rotation of plastic disc 32 and rotating ceramic disc 34 which are keyed thereto. Fixed disc 36 will not rotate with rotating disc 34 as the projections 114 and 116 hold it in a fixed position. Thus, openings 100 and 102 will be adjusted with respect to openings 110 and 112 whereby the flow of fluid through the valve body between inlet 144 and outlets 56 and 58 will be controlled. O-rings 26 and 28 prevent water from flowing between valve stem 34 and valve body 22. O-ring 38 prevents water from flowing past retainer 40 and between disc 36 and valve body 22, as well as preventing water from flowing between retainer 40 and valve body.

It can thus be seen that a valve is shown which is easy to manufacture and provides a secure assembly. Additionally, the retainer which is used to secure the components of the valve cartridge within the valve body secures an O-ring against the ceramic cartridges in a predetermined position which exerts a predetermined amount of force against the ceramic plates. The valve assembly thus avoids the problem of the prior art wherein the valve assembly bodies were difficult to manufacture and the retainers and sealing gaskets exerted an indeterminate amount of force on the ceramic discs and thus could cause premature wearing of the contacting surface. The above description is considered that of the preferred embodiment only, and modifications of the invention will occur to those who make or use the invention. Therefore, it is to be understood that the embodiments shown in the drawings and described above are merely for illustrative purposes and are not intended to limit the scope of the invention, which is defined by the following claims as interpreted according to the principles of patent law.

The embodiments of the invention in which an exclusive property or privilege is claimed are defined as follows.

1. A ceramic, valve cartridge comprising:

a generally cylindrical valve body including an opening on first and second opposite ends of said body, and at least one opening intermediate said ends of said body;

an actuator stem carried by said housing, a portion of said actuator stem projecting through the opening on said first end of said body, and rotating within said body;

a disc stack carried within said body comprising a rotating ceramic disc, and a fixed ceramic disc, said stem and said rotating ceramic disc being operably connected, and said fixed ceramic disc being positioned adjacent said rotating ceramic disc;

a sealing means adapted to be positioned adjacent said fixed ceramic disc; and a force-fit retainer positioned on the second end of said valve assembly body, an outside diameter of said retainer at least equal to the outside diameter of said valve body, said retainer having a stepped annular recess adapted to be frictionally secured on said second end of said body, whereby a portion of said retainer contacts the inside surface of said valve body and a portion of said retainer contacts said second end of said valve boy to positively locate said retainer relative to said body, said retainer frictionally securing said sealing means and said disc stack within said body.

2. A valve cartridge including a fixed ceramic disc and a rotating ceramic disc, said discs for controlling fluid flow between an inlet and at least one outlet of said cartridge, said cartridge comprising:

a body having said outlet therein, said body comprising an opening at one end; and a retainer comprising first and second orthogonal surfaces which are complementary to said body, said retainer being positioned in said opening against first and second orthogonal surfaces of said body, said first surface of said body being said one end of said body whereby said retainer is positively located on said body by said first surface of said retainer engaging said first surface of said body to positively locate said retainer relative to said body and thereby control the force applied by said retainer to said discs and said second surface of said retainer frictionally engaging said second surface of said body to frictionally secure said retainer on said one end of said cartridge whereby said discs are secured with said valve cartridge body with a positively controlled force pressing said discs into engagement with one another.

3. A valve cartridge including a fixed ceramic disc and a rotating ceramic disc, said discs for controlling fluid flow between an inlet and at least one outlet of said cartridge, said cartridge comprising:

a body having said outlet therein, said body comprising on opening at one end; and a retainer comprising first and second orthogonal surfaces which are complementary to said body said retainer being positioned in said opening against two orthogonal surfaces of said body, one of said orthogonal surfaces of said body being said one end of said body, whereby said retainer is positively located in and is frictionally secured to said body and secures said discs within the valve cartridge body, and wherein said retainer is stepped whereby said first surface of said retainer is at a diameter of said body, and said second surface of said retainer is at a diameter which is substantially equal to an inside diameter of said body.

4. The valve cartridge as defined in claim 1, wherein said retainer is ring-like and includes a central opening through which fluid enters said valve body.

5. The valve cartridge as defined in claim 1, wherein said retainer has a first side which contacts said second end of said valve body and a second side which includes an annular channel for receiving an O-ring therein.

6. The valve cartridge as defined in claim 2 wherein said retainer carries a first resilient ring which is positioned between said retainer and said fixed ceramic disc to provide a fluid seal, said retainer having third and fourth orthogonal surfaces which contact said resilient ring.

7. The valve cartridge as defined in claim 6 wherein said ring seal retainer includes a channel which receives a second resilient ring for providing a seal between said valve cartridge and a casting with which said valve assembly is used.

8. The valve cartridge as defined in claim 3, wherein said second surface of said retainer is adapted to be parallel to the inside surface of said body when said retainer is inserted in said body, whereby said inside surface of said body frictionally contacts said second surface of said retainer.

9. The valve cartridge as defined in claim 2, wherein said retainer and said body are brass.

10. The ceramic valve cartridge as defined in claim 1, wherein said valve body and said retainer are metal.

11. The ceramic valve cartridge as defined in claim 10, wherein said valve body and said retainer are brass.

12. The ceramic valve cartridge as defined in claim 1, wherein said stepped annular recess includes a first annular surface for contacting said second end of said valve body, a second surface orthogonal to said first surface for contacting said inside surface of said valve body, a third surface orthogonal to said second surface for contacting a resilient ring, and a fourth surface orthogonal to said third surface for contacting said resilient ring.

13. The ceramic valve as defined in claim 2 wherein said retainer includes a channel circumscribing said central opening for receiving a resilient ring, said circumscribing channel having three surfaces for contacting said resilient ring.

14. The valve cartridge as defined in claim 6 wherein said second surface is orthogonal to said third surface.

*15. A ceramic valve cartridge comprising:*

*a generally cylindrical rigid valve body including an opening on first and second opposite ends of said body;*

*an actuator stem carried by said body, a portion of said actuator stem projecting through the opening on said first end of said body, and rotating within said body;*

*a disc stack carried within said body comprising a rotating ceramic disc and a fixed ceramic disc, said stem and said rotating ceramic disc being operably connected, and said fixed ceramic disc being positioned adjacent said rotating ceramic disc;*

*a sealing means positioned adjacent said fixed ceramic disc; and*

*an inflexible retainer force fit onto the second end of said valve body, said retainer having a stepped annular recess frictionally secured proximate said second end of said body with a portion of said stepped annular recess of said retainer frictionally engaging said valve body and an adjacent portion of said stepped annular recess of said retainer abutting said valve body to positively locate said retainer relative to said valve body, said retainer securing said sealing means and said disc stack within said valve body whereby to assure a predetermined force on the disc stack.*

*16. A valve cartridge including a fixed ceramic disc and a rotating ceramic disc, said discs controlling fluid flow between an inlet and at least one outlet of said cartridge, said cartridge comprising:*

*a body having said at least one outlet therein and including an opening at one end and further including first and second orthogonal surfaces; and*

*a retainer comprising first and second orthogonal surfaces which are complementary to said first and second orthogonal surfaces of said body, said retainer being positioned proximate said opening against first and second orthogonal surfaces of said body, said first surface of said body being accessible from said one end of said body by said retainer whereby said retainer is positively located on said body by said first surface of said retainer engaging said first surface of said body which thus positively locates said retainer relative to said body and thereby controls the force applied by said retainer to said discs, and said second surface of said retainer frictionally engaging said second surface of said body to frictionally secure said retainer on said one end of said cartridge whereby said discs are secured with said valve cartridge body with a positively controlled force pressing said discs into engagement with one another.*

*17. A valve cartridge including a fixed ceramic disc and a rotating ceramic disc, said discs controlling fluid flow between an inlet and at least one outlet of said cartridge, said cartridge comprising:*

*a body having said outlet therein, said body including an opening at one end and a step defining first and second orthogonal surfaces; and*

*a retainer comprising third and fourth orthogonal surfaces which are complementary to said first and second orthogonal surfaces of said body, said retainer being positioned proximate said opening against said first and second orthogonal surfaces of said body, said orthogonal surfaces of said body being accessible from said one end of said body and engageable by said retainer, whereby said retainer is positively located relative to said body by engagement of said first and third orthogonal surfaces and is frictionally secured to said body by engagement of said second and fourth orthogonal surfaces and thus secures said discs within the valve cartridge body, and wherein said fourth orthogonal surface of said retainer has a diameter which is adapted to be frictionally force-fit into secure engagement with said second orthogonal surface of said body.*

* * * * *